US010273972B2

(12) United States Patent
Maalouf et al.

(10) Patent No.: US 10,273,972 B2
(45) Date of Patent: Apr. 30, 2019

(54) ROTOR FOR GAS TURBINE ENGINE

(71) Applicant: United Technologies Corporation, Farmington, CT (US)

(72) Inventors: Fadi S. Maalouf, East Hampton, CT (US); Christopher L. Potter, East Hampton, CT (US); Michael Espinoza, Middletown, CT (US); Eliannah Hunderfund, Hartford, CT (US); Steven M. Modon, Portland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 724 days.

(21) Appl. No.: 14/944,303

(22) Filed: Nov. 18, 2015

(65) Prior Publication Data
US 2017/0138368 A1 May 18, 2017

(51) Int. Cl.
F04D 29/32 (2006.01)
F02C 3/04 (2006.01)
F04D 19/02 (2006.01)
F01D 5/06 (2006.01)

(52) U.S. Cl.
CPC .......... F04D 29/324 (2013.01); F01D 5/066 (2013.01); F02C 3/04 (2013.01); F04D 19/02 (2013.01); F05D 2220/32 (2013.01); F05D 2230/10 (2013.01); F05D 2230/642 (2013.01); F05D 2240/30 (2013.01); F05D 2240/80 (2013.01); F05D 2250/712 (2013.01);
(Continued)

(58) Field of Classification Search
CPC . F01D 5/066; F02C 3/04; F04D 19/02; F04D 29/324; F05D 2220/32; F05D 2230/10; F05D 2230/642; F05D 2240/30; F05D 2240/80; F05D 2250/712; F05D 2260/30; F05D 2260/941; F05D 2300/50212
See application file for complete search history.

(56) References Cited

U.S. PATENT DOCUMENTS 5,220,784 A * 6/1993 Wilcox ................. B63H 21/16
416/198 A
5,435,694 A * 7/1995 Kray ...................... F01D 5/141
416/219 R
(Continued)

FOREIGN PATENT DOCUMENTS

WO 2014160215 A1 10/2014
WO 2015023860 A1 2/2015

OTHER PUBLICATIONS

European Search Report and Written Opinion; European Application No. 16199525.3; International Filing Date: Nov. 18, 2016; dated Apr. 29, 2017; 7 pages.

Primary Examiner — William M McCalister
(74) Attorney, Agent, or Firm — Cantor Colburn LLP

(57) ABSTRACT

A rotating component for a turbine engine includes a main component portion including a web and a platform located at a radially outboard portion of the web, relative to an axis of rotation of the rotating component. A snap surface is located at the platform and is configured to interlock the rotating component with an adjacent rotating component. A transition surface extends from the main component portion to the snap surface and includes two or more different radii.

14 Claims, 3 Drawing Sheets

(52) U.S. Cl.
CPC .... *F05D 2260/30* (2013.01); *F05D 2260/941* (2013.01); *F05D 2300/50212* (2013.01)

(56) References Cited

U.S. PATENT DOCUMENTS

| | | | | |
|---|---|---|---|---|
| 5,537,814 | A * | 7/1996 | Nastuk | F01D 5/066 60/796 |
| 6,267,553 | B1 * | 7/2001 | Burge | F01D 5/06 415/115 |
| 7,186,079 | B2 * | 3/2007 | Suciu | F01D 5/066 415/199.5 |
| 8,459,943 | B2 * | 6/2013 | Schutte | F01D 5/066 415/199.4 |
| 9,909,595 | B2 * | 3/2018 | Colletti | F04D 29/644 |
| 2006/0099070 | A1 * | 5/2006 | Suciu | F01D 5/066 415/199.5 |
| 2006/0099078 | A1 * | 5/2006 | Rice | B23H 9/10 416/234 |
| 2008/0181779 | A1 * | 7/2008 | Decardenas | F01D 5/147 416/219 R |
| 2011/0064580 | A1 * | 3/2011 | Barnes | F01D 5/143 416/204 A |
| 2012/0027606 | A1 * | 2/2012 | Malmborg | F01D 5/081 416/223 A |
| 2013/0259659 | A1 * | 10/2013 | Knaul | F16J 15/4472 415/170.1 |

* cited by examiner

ROTOR FOR GAS TURBINE ENGINE

BACKGROUND

This disclosure relates to gas turbine engines, and more particularly to rotating components of gas turbine engines.

Gas turbine engines, such as those used to power modern commercial and military aircrafts, generally include a compressor section to pressurize an airflow, a combustor section for burning hydrocarbon fuel in the presence of the pressurized air, and a turbine section to extract energy from the resultant combustion gases. The airflow flows along a gaspath through the gas turbine engine.

The gas turbine engine includes a plurality of rotors arranged along an axis of rotation of the gas turbine engine, in both the compressor section and the turbine section. Some of these rotors are connected to axially adjacent rotors, spacers, or other rotating components, via interference fit, also known in the art as a "snap fit". The rotor in general, and the snap flange of the rotor in particular can be a highly stressed area during operation of the gas turbine aircraft. It is desired to reduce stresses in this area to prolong the service life of the rotor.

SUMMARY

In one embodiment, a rotating component for a turbine engine includes a main component portion including a web and a platform located at a radially outboard portion of the web, relative to an axis of rotation of the rotating component. A snap surface is located at the platform and is configured to interlock the rotating component with an adjacent rotating component. A transition surface extends from the main component portion to the snap surface and includes two or more different radii.

Additionally or alternatively, in this or other embodiments the transition surface includes a first radius extending from the web to a transition point and a second radius extending from the transition point to the snap surface.

Additionally or alternatively, in this or other embodiments the first radius is larger than the second radius.

Additionally or alternatively, in this or other embodiments the transition point is radially outboard of the snap surface.

Additionally or alternatively, in this or other embodiments the transition surface includes a first radius extending from the platform to a transition point and a second radius extending from the transition point to the snap surface.

In another embodiment, a compressor rotor for a gas turbine engine includes a plurality of rotor blades and a main rotor portion supporting of the plurality of rotor blades. The main rotor portion includes a radially-extending web portion and a platform portion affixed to the web portion and supportive of the plurality of rotor blades. A snap surface is located at the platform portion and is configured to interlock the compressor rotor with an adjacent rotating component. A transition surface extends from the main rotor portion to the snap surface, the transition surface including two or more different radii.

Additionally or alternatively, in this or other embodiments the transition surface includes a first radius extending from the web to a transition point and a second radius extending from the transition point to the snap surface.

Additionally or alternatively, in this or other embodiments the first radius is larger than the second radius.

Additionally or alternatively, in this or other embodiments the first radius is about two times the second radius.

Additionally or alternatively, in this or other embodiments the transition point is radially outboard of the snap surface.

Additionally or alternatively, in this or other embodiments the transition surface includes a first radius extending from the platform to a transition point and a second radius extending from the transition point to the snap surface.

Additionally or alternatively, in this or other embodiments the adjacent rotating component is one of an adjacent compressor rotor or a compressor spacer.

Additionally or alternatively, in this or other embodiments the snap surface defines an interference fit between the compressor rotor and the adjacent rotating component.

In yet another embodiment, a gas turbine engine includes a turbine section, a combustor section to provide combustion gases to the turbine section, and a compressor section to compress an airflow and direct the compressed airflow toward the combustor. The compressor section includes a compressor rotor having a plurality of rotor blades and a main rotor portion supporting of the plurality of rotor blades. The main rotor portion includes a radially-extending web portion and a platform portion affixed to the web portion and supportive of the plurality of rotor blades. A snap surface is located at the platform portion and is configured to interlock the compressor rotor with an adjacent rotating component. A transition surface extends from the main rotor portion to the snap surface, the transition surface including two or more different radii.

Additionally or alternatively, in this or other embodiments the transition surface includes a first radius extending from the web to a transition point and a second radius extending from the transition point to the snap surface.

Additionally or alternatively, in this or other embodiments the first radius is larger than the second radius.

Additionally or alternatively, in this or other embodiments the first radius is about two times the second radius.

Additionally or alternatively, in this or other embodiments the transition point is radially outboard of the snap surface.

Additionally or alternatively, in this or other embodiments the transition surface includes a first radius extending from the platform to a transition point and a second radius extending from the transition point to the snap surface.

Additionally or alternatively, in this or other embodiments the adjacent rotating component is one of an adjacent compressor rotor or a compressor spacer.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
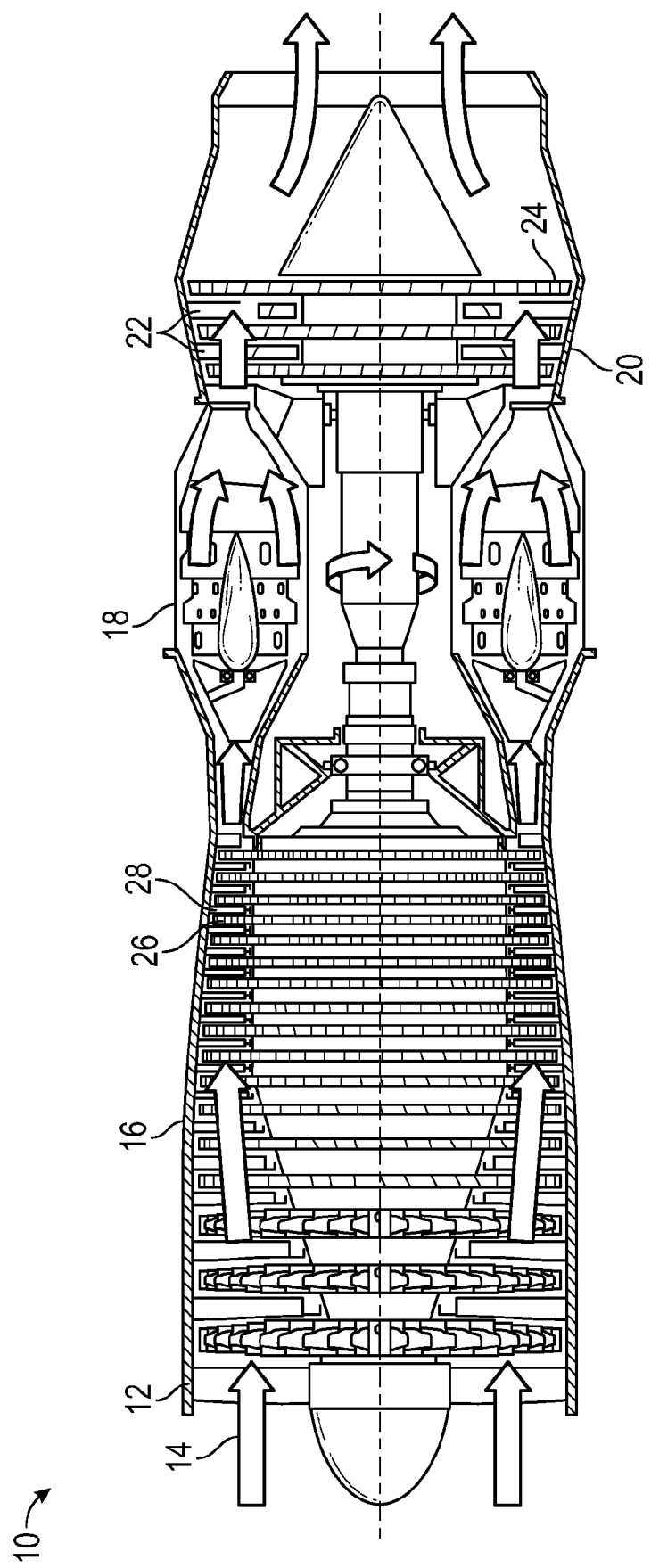
FIG. 1 illustrates a schematic cross-sectional view of an embodiment of a gas turbine engine.

FIG. 1 is a schematic illustration of a gas turbine engine 10. The gas turbine engine generally has a fan 12 through which ambient air is propelled in the direction of arrow 14, a compressor 16 for pressurizing the air received from the fan 12 and a combustor 18 wherein the compressed air is mixed with fuel and ignited for generating combustion gases.

The gas turbine engine 10 further comprises a turbine section 20 for extracting energy from the combustion gases. Fuel is injected into the combustor 18 of the gas turbine engine 10 for mixing with the compressed air from the compressor 16 and ignition of the resultant mixture. The fan 12, compressor 16, combustor 18, and turbine 20 are typically all concentric about a common central longitudinal axis of the gas turbine engine 10. In some embodiments, the turbine 20 includes one or more turbine stators 22 and one or more turbine rotors 24. Likewise, the compressor 16 includes one or more compressor rotors 26 and one or more compressor stators 28. It is to be appreciated that while description below relates to compressors 16 and compressor rotors 26, one skilled in the art will readily appreciate that the present disclosure may utilized with respect to turbine rotors 24.

Figure 2:
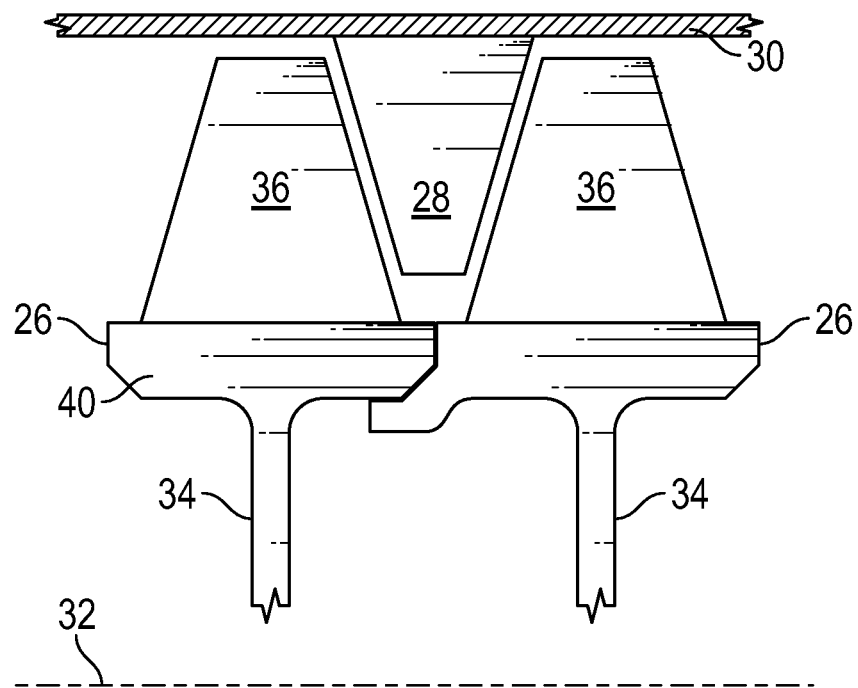
FIG. 2 illustrates a schematic cross-sectional view of an embodiment of a compressor of a gas turbine engine.

Referring now to FIG. 2, The compressor 16 includes a compressor case 30, in which the compressor rotors 26 are arranged along an engine axis 32 about which the compressor rotors 26 rotate. Each compressor rotor 26 includes a rotor disc 34 with a plurality of rotor blades 36 extending radially outwardly from the rotor disc 34. In some embodiments, the rotor disc 34 and the plurality of rotor blades 36 are a single, unitary structure, an integrally bladed compressor rotor 26. In other embodiments, the rotor blades 36 are each installed to the rotor disc 34 via, for example, a dovetail joint where a tab or protrusion at the rotor blade 36 is inserted into a corresponding slot in the rotor disc 34.

Figure 3:
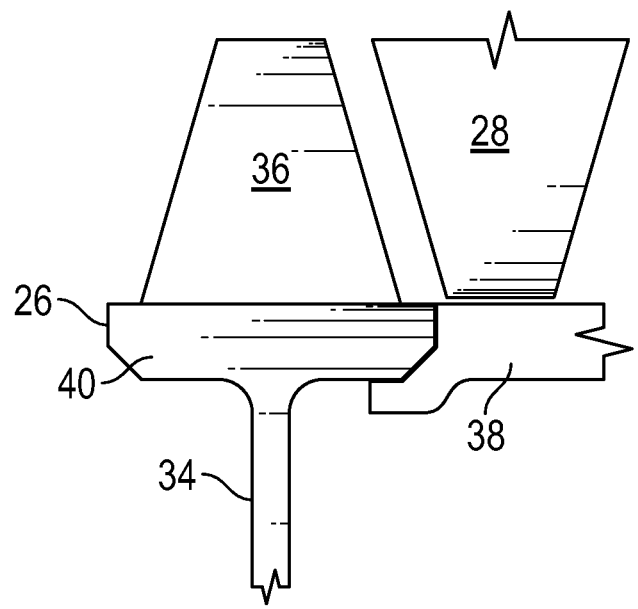
FIG. 3 illustrates a schematic cross-sectional view of another embodiment of a compressor of a gas turbine engine.

As shown in FIG. 2, axially adjacent compressor rotors 26 may be joined to each other, while in other embodiments, as shown in FIG. 3, the compressor rotor 26 may be joined to another rotating component, such as a spacer 38. The compressor rotor 26 is secured to the adjacent rotating component by an interference fit, which in some embodiments is combined with another mechanical fastening, such as a plurality of bolts (not shown) to secure the components.

Figure 4:
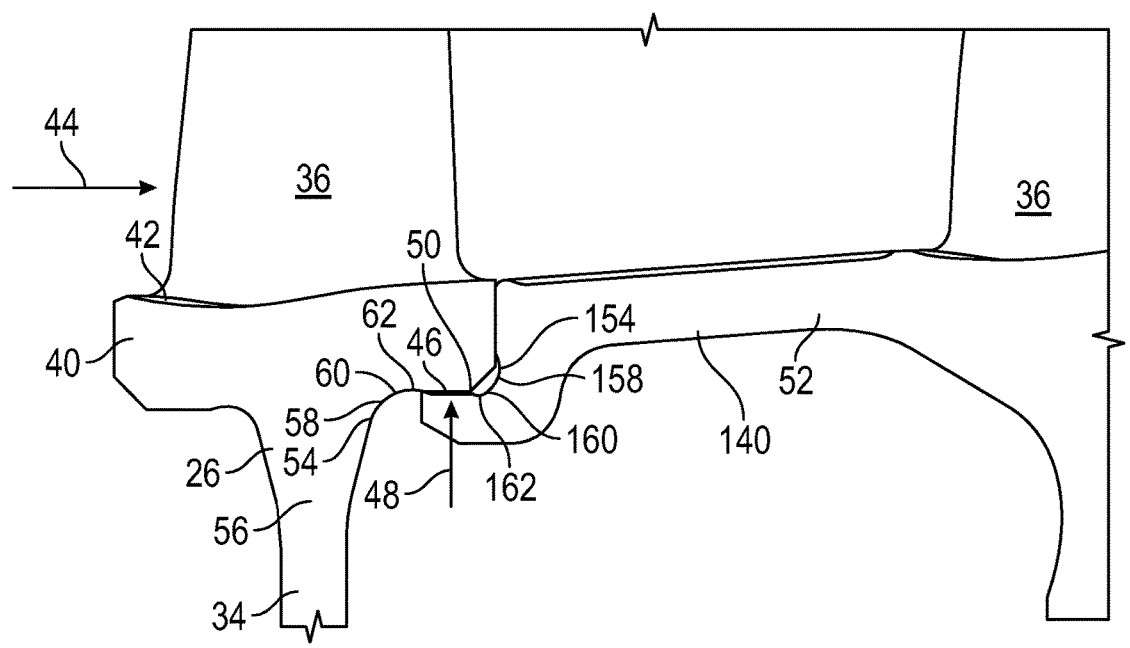
FIG. 4 illustrates a schematic cross-sectional view of an embodiment of a compressor rotor for a gas turbine engine.

Referring now to FIG. 4, a more detailed view of the interference fit, also referred to as a "snap fit", between the compressor rotor 26 and the adjacent rotating component is shown. Compressor rotor 26, as stated above, includes a plurality of rotor blades 36 secured to, and radially extending from a rotor disc 34. In particular, the rotor blades 36 extend from a blade platform 40 portion of the rotor disc 34. The blade platform 40 extends in a substantially axial direction, and includes a flowpath surface 42 that defines an inner boundary of a flowpath 44 of the gas turbine engine 10. A radially inboard platform surface 46, opposite the flowpath surface 42 and radially inboard therefrom, defines a rotor snap diameter 48. The rotor snap diameter 48 interfaces with an adjacent component snap diameter 50 to join the compressor rotor 26 and the adjacent component 52.

In their respective free, unrestrained states, and when unjoined, the adjacent component snap diameter 50 is larger than the rotor snap diameter 48. To join the components, the compressor rotor 26 may heated and/or the adjacent component 52 may be cooled to temporarily enlarge the rotor snap diameter 48 and/or temporarily cool the adjacent component snap diameter 50, respectively. The components then may be joined, and when returned to ambient temperature the desired interference fit is achieved between the rotor snap diameter 48 and the adjacent component snap diameter 50.

The snap diameters 48, 50 are formed in the components by, for example, a grinding operation. The grinding operation is performed during manufacture after surface treatment of the compressor rotor 26 by, for example, shot peening. Any inadvertent damage to the peened surface during grinding requires the compressor rotor 26 to be retreated by shot peening. To reduce the risk of inadvertent damage to the compressor rotor 26, a transition area 54 between the rotor snap diameter 48 and a web 56 of the rotor disc 34 includes a compound radius. The web 56 extends from an inner radial extent of the rotor disc 34 to the blade platform 40.

The transition area 54 includes a first radius 58 extending from the web 56 to a transition point 60 radially outboard of the snap diameter 48. To minimize stresses and increase durability of the compressor rotor 26, the first radius 58 is selected to be as large as practicable. A second radius 62 extends from the transition point 60 to the rotor snap diameter 48 and is smaller than first radius 58. In some embodiments, the first radius 58 is about two times the second radius 62. Further, in some embodiments, the first radius 58 is between about 50 and about 0.100", and in other embodiments the second radius 62 is between about 0.020" and about 0.050".

The transition area 54 including first radius 58 and second radius 62 is beneficial to the compressor rotor 26 and to the gas turbine engine 10 in several ways. The large first radius 58 reduces stresses on the compressor rotor 26 and improves durability of the compressor rotor 26. Further, the smaller second radius 62 allows for snap diameter 48 to have a larger axial width greater than a compressor rotor with a single-radius transition. Also, the use of a relatively small second radius 62 enables an increase in first radius 58 to lower compressor rotor stresses.

In some embodiments, adjacent component 52 includes a transition area 154. Similarly, the transition area 154 includes a first radius 158 extending from a platform 140 to a transition point 160 radially inboard of the adjacent component snap diameter 50. To minimize stresses and increase durability, the first radius 158 is selected to be as large as practicable. A second radius 162 extends from the transition point 160 to the adjacent component snap diameter 50 and is smaller than first radius 158. In some embodiments, the first radius 158 is about two times the second radius 162. Further, in some embodiments, the first radius 158 is between about 0.050" and about 0.100", and in other embodiments the second radius 162 is between about 0.020" and about 0.050".

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A rotating component for a turbine engine comprising:
   a main component portion including:
      a web; and a platform disposed at a radially outboard portion of the web, relative to an axis of rotation of the rotating component;

a radially inboard platform surface defining a snap diameter thereat, the radially inboard platform surface disposed at the platform and configured to interlock the rotating component with an adjacent rotating component at an adjacent rotating component surface radially inboard of the radially inboard platform surface; and a transition surface extending from the main component portion to the radially inboard platform surface including two or more different radii, the transition surface including:

a first radius of the two or more different radii extending radially outwardly from the web to a transition point; and a second radius of the two or more different radii extending from the transition point to the radially inboard platform surface;

wherein the transition point is radially outboard of the radially inboard platform surface.

2. The rotating component of claim 1, wherein the first radius is larger than the second radius.

3. The rotating component of claim 1, wherein the transition surface includes:

a first radius extending from the platform to a transition point; and a second radius extending from the transition point to the radially inboard platform surface.

4. A compressor rotor for a gas turbine engine comprising:
a plurality of rotor blades;
a main rotor portion supporting of the plurality of rotor blades, the main rotor portion including:
a radially-extending web portion; and
a platform portion affixed to the web portion and supportive of the plurality of rotor blades;

a radially inboard platform surface defining a snap diameter thereat, the radially inboard platform surface disposed at the platform portion and configured to interlock the compressor rotor with an adjacent rotating component at an adjacent rotating component surface radially inboard of the radially inboard platform surface; and a transition surface extending from the main component portion to the radially inboard platform surface including two or more different radii, the transition surface including:

a first radius of the two or more different radii extending radially outwardly from the web to a transition point; and a second radius of the two or more different radii extending from the transition point to the radially inboard platform surface;

wherein the transition point is radially outboard of the radially inboard platform surface.

5. The compressor rotor of claim 4, wherein the first radius is larger than the second radius.

6. The compressor rotor of claim 5, wherein the first radius is about two times the second radius.

7. The compressor rotor of claim 4, wherein the transition surface includes:

a first radius extending from the platform to a transition point; and a second radius extending from the transition point to the radially inboard platform surface.

8. The compressor rotor of claim 4, wherein the adjacent rotating component is one of an adjacent compressor rotor or a compressor spacer.

9. The compressor rotor of claim 4, wherein the radially inboard platform surface defines an interference fit between the compressor rotor and the adjacent rotating component.

10. A gas turbine engine comprising:
a turbine section;
a combustor section to provide combustion gases to the turbine section; and
a compressor section to compress an airflow and direct the compressed airflow toward the combustor, the compressor section including a compressor rotor having:
a plurality of rotor blades;
a main rotor portion supporting of the plurality of rotor blades, the main rotor portion including:
a radially-extending web portion; and
a platform portion affixed to the web portion and supportive of the plurality of rotor blades;
a radially inboard platform surface defining a snap diameter thereat, the radially inboard platform surface disposed at the platform portion and configured to interlock the compressor rotor with an adjacent rotating component at an adjacent rotating component surface radially inboard of the radially inboard platform surface; and
a transition surface extending from the main component portion to the radially inboard platform surface including two or more different radii, the transition surface including:
a first radius of the two or more different radii extending radially outwardly from the web to a transition point; and
a second radius of the two or more different radii extending from the transition point to the radially inboard platform surface;
wherein the transition point is radially outboard of the radially inboard platform surface.

11. The gas turbine engine of claim 10, wherein the first radius is larger than the second radius.

12. The gas turbine engine of claim 11, wherein the first radius is about two times the second radius.

13. The gas turbine engine of claim 10, wherein the transition surface includes:

a first radius extending from the platform to a transition point; and a second radius extending from the transition point to the radially inboard platform surface.

14. The gas turbine engine of claim 10, wherein the adjacent rotating component is one of an adjacent compressor rotor or a compressor spacer.

* * * * *